July 14, 1953
C. H. OERTEL
2,644,956
SALIVA BOWL GUARD
Filed Dec. 4, 1950
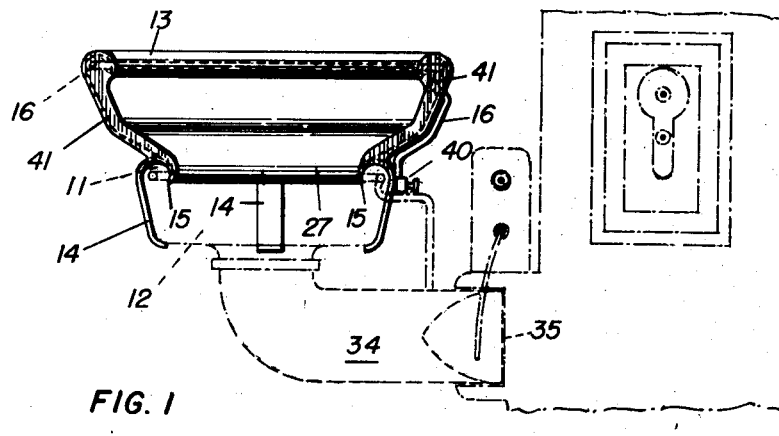
FIG. 1
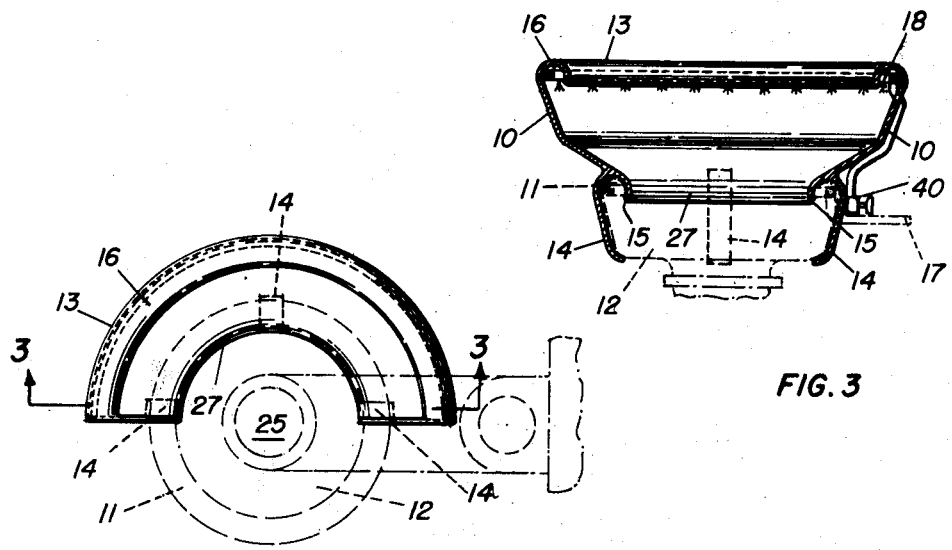
FIG. 2
FIG. 3
INVENTOR.
CARL H. OERTEL
BY Howard J. Whelan.
ATTORNEY Patented July 14, 1953

2,644,956

UNITED STATES PATENT OFFICE 2,644,956

SALIVA BOWL GUARD

Carl H. Oertel, Baltimore, Md.

Application December 4, 1950, Serial No. 199,081

3 Claims. (Cl. 4—263)

This invention relates to dental equipment and more particularly to dispensers for the conveyance of oral excreta to a disposal point, and the use of a protector apron therewith.

This invention is based on the original structure illustrated in the U. S. patent application Serial Number 759,070 filed by the same applicant, now matured into Patent No. 2,549,514, and is composed of subject matter selected therefrom.

The object of the present invention is to provide a new and improved dental dispenser apron that can be conveniently attached and connected to a conventional dental bowl.

Another object of the invention is to provide a new and improved dental dispenser apron that will be of the self-cleaning type even though not integral with the dental bowl it is used with.

A further object of this invention is to provide a new and improved dental bowl apron of simple and inexpensive construction that will be effective for the work intended, attractive in design and convenient to use.

Additional objects of the invention will be indicated as it is outlined in its details.

For a better understanding of the invention, its objects, principles and operation, reference is made to the accompanying drawings, which, when used in conjunction with the following description, illustrate a particular form of the invention, with the claims indicating the scope of the invention.

Referring to the drawings:

Figure 1 is a side elevation of a protector saliva apron embodying this invention, and shown applied to a conventional dental bowl;

Figure 2 is a plan view of the apron shown in Figure 1; and

Figure 3 is a sectional elevation on line 3—3 of Figure 2.

Similar reference numerals pertain to the same parts throughout the drawings.

In the construction shown, a protector apron 10, also variously termed a cuspidor shield or a saliva apron for a dental bowl or cuspidor basin, is shown attached to the rim 11 of a conventional dental bowl 12, so as to encompass about half the peripheral area thereof and extend up with increasing diametrical width to about double the depth of the bowl. The upper peripheral portion of the apron 10 is formed with an attractive inwardly contoured rim 13. The lower portion extends into a plurality of clamping elements 14 formed to resiliently encompass the peripheral surface of the bowl 12 which in conjunction with a large beaded rim 15 engaging over the upper rim of the bowl, serves to hold the apron securely in place thereon. However the elements 14 are flexible enough to permit disengagement and the removal of the apron if it is to be desired. Both the apron rims 13 and 15 are made open, so they will provide ample space for the running of a water tube 16 and the placement on the rim of the bowl respectively, underneath them as indicated. The ends 41 of the rim 13 are preferably closed to prevent water splashing. The water tube 16 is made removably attachable to the main water tube 17 assembly in the conventional bowl 12. The water tube 16 is perforated at 18 to provide a series of spaced orifices through which the water in the tube can squirt onto the inner surface of the apron and wash it off into the bowl. The tube 16 may be brought up from the connection made to the main tube 17 and valve 40 in any convenient manner. That shown, wherein the tube 16 is brought up on the outside, is simple and convenient. It is however, appreciated that it could be incorporated as a duct in the shield structure and the apron made complete with the duct integral with it.

The device, by being removable, offers particular advantages desirable for many conditions. The apron can be removed bodily and thrown into an antiseptic bath for cleaning, or it can be washed off while in place on the dental bowl. Repairs are readily made because the parts are readily accessible when the shield has been removed. Also, all crevices are exposed when it is removed and made accessible for close cleaning. The material of which the shield may be made, is a matter of some importance, and for that reason white enameled finish, plastic or stainless steel are generally preferred.

While but one form of the invention is illustrated in this application, it is not desired to limit the construction of devices to such structure, as it is appreciated that other forms could be developed and made that would use the same principles and be included in the scope of the appended claims.

Having thus described the invention, what is claimed is:

1. In combination with a dental bowl for oral excreta, an apron formed to fit around a predetermined portion of said bowl and including clamps for removably attaching it thereto, said apron having portions bent into an inwardly curved form to fit over the rim of said bowl to be supported thereby, and means for conveying water to the apron and distributing it across the inner face thereof, said means attached to said apron and including means for coupling it to an extraneous water supply.

2. In combination with a dental bowl for oral excreta, an apron formed to fit around a predetermined portion of said bowl and including clamps for removably attaching it thereto, said apron having portions bent into an inwardly curved form to fit over the rim of said bowl to be supported thereby, means for conveying water to the apron and distributing it across the inner face thereof, said means attached to said apron and including means for coupling it to an extraneous water supply, said apron including an upper rim wherein said means is disposed and adapted to spray the water downward therefrom.

3. In combination with a dental bowl for oral excreta, an apron formed to fit around a predetermined portion of said bowl and including clamps for removably attaching it thereto, said apron having portions bent into an inwardly curved form to fit over the rim of said bowl to be supported thereby, means for conveying water to the apron and distributing it across the inner face thereof, said means attached to said apron and including means for coupling it to an extraneous water supply, said apron including an upper rim wherein said means is disposed and adapted to spray the water downward therefrom, said means including a duct incorporated in the apron structure leading from the first mentioned rim and vicinity where the water supply is provided for said bowl.

CARL H. OERTEL.

References Cited in the file of this patent
UNITED STATES PATENTS

| Number | Name | Date |
|---|---|---|
| 421,467 | Abraham | Feb. 18, 1890 |
| 792,498 | Carr | June 13, 1905 |
| 1,166,298 | Wospil | Dec. 28, 1915 |
| 2,035,567 | Piper | Mar. 31, 1936 |